United States Patent
Wastian et al.

(10) Patent No.: US 12,473,253 B2
(45) Date of Patent: Nov. 18, 2025

(54) METHOD FOR OPERATING A PLANT FOR CONTINUOUS PRODUCTION OF AN ISOCYANATE

(71) Applicant: Covestro Deutschland AG, Leverkusen (DE)

(72) Inventors: Dietmar Wastian, Dormagen (DE); Anke Hielscher, Cologne (DE); Juergen Spriewald, Cologne (DE); Achim Wildermuth, Neuss (DE)

(73) Assignee: Covestro Deutschland AG, Leverkusen (DE)

( * ) Notice: Subject to any disclaimer, the term of this patent is extended or adjusted under 35 U.S.C. 154(b) by 550 days.

(21) Appl. No.: 17/996,534

(22) PCT Filed: May 12, 2021

(86) PCT No.: PCT/EP2021/062690
§ 371 (c)(1),
(2) Date: Oct. 19, 2022

(87) PCT Pub. No.: WO2021/228977
PCT Pub. Date: Nov. 18, 2021

(65) Prior Publication Data
US 2023/0212109 A1   Jul. 6, 2023

(30) Foreign Application Priority Data
May 15, 2020  (EP) ..................................... 20174918

(51) Int. Cl.
*C07C 263/10*  (2006.01)
*C07C 263/20*  (2006.01)

(52) U.S. Cl.
CPC .......... *C07C 263/10* (2013.01); *C07C 263/20* (2013.01)

(58) Field of Classification Search
CPC .... C07C 263/10; C07C 263/20; C07C 265/14
See application file for complete search history.

(56) References Cited

U.S. PATENT DOCUMENTS

| | | | |
|---|---|---|---|
| 4,581,174 A | 4/1986 | Ohlinger et al. | |
| 5,931,579 A | 8/1999 | Gallus et al. | |
| 7,112,694 B2 | 9/2006 | Woelfert et al. | |
| 7,504,533 B2 | 3/2009 | Boehm et al. | |
| 7,547,801 B2 | 6/2009 | Pohl et al. | |
| 7,851,648 B2 | 12/2010 | Sohn et al. | |
| 8,079,752 B2 | 12/2011 | Rausch et al. | |
| 8,097,751 B2 | 1/2012 | Koch et al. | |
| 9,796,669 B2 | 10/2017 | Knauf et al. | |
| 10,577,311 B2 | 3/2020 | Knauf et al. | |
| 10,851,048 B2 | 12/2020 | Knauf et al. | |
| 10,875,827 B2 | 12/2020 | Knauf et al. | |
| 2006/0025556 A1* | 2/2006 | Koch ................... C07C 263/10 528/44 |
| 2007/0265465 A1 | 11/2007 | Keggenhoff et al. | |
| 2017/0101368 A1* | 4/2017 | Knauf ................... C07C 263/10 |

FOREIGN PATENT DOCUMENTS

GB   1173890 A   12/1969

OTHER PUBLICATIONS

International Search Report in PCT/EP2021/062690, date of mailing: Sep. 6, 2021, Authorized officer: Stefania Tabanella.

* cited by examiner

*Primary Examiner* — Andrew D Kosar
*Assistant Examiner* — Blaine G Doletski
(74) *Attorney, Agent, or Firm* — Donald R. Palladino

(57) ABSTRACT

The present invention relates to a method for operating a plant for continuous production of an isocyanate by converting a primary amine A with phosgene P whilst maintaining, based on the amino groups of the primary amine, a stoichiometric excess of phosgene in the presence of a solvent L in the liquid phase, using a first, adiabatically operated reaction chamber and a second, isothermally operated reaction chamber. The method is characterised in that a combination of measures, in particular the maintenance of a sufficiently high starting pressure and a sufficiently high starting temperature, is applied in order to bring the plant back into the target state, standard operation, starting from a state of interruption to production.

15 Claims, No Drawings

METHOD FOR OPERATING A PLANT FOR CONTINUOUS PRODUCTION OF AN ISOCYANATE

CROSS-REFERENCE TO RELATED APPLICATION

This application is a national stage application under 35 U.S.C. § 371 of PCT/EP2021/062690, filed May 12, 2021, which claims the benefit of European Application No. 20174918.1, filed May 15, 2020, each of which is incorporated herein by reference.

FIELD

The present invention relates to a process for operating a plant for continuous preparation of an isocyanate by reaction of a primary amine A with phosgene P while maintaining a stoichiometric excess of phosgene based on the amino groups of the primary amine in the presence of a solvent L in the liquid phase using a first adiabatically operated reaction space and a second isothermally operated reaction space. The process has the feature that a combination of measures, in particular the maintenance of a sufficiently high starting pressure and a sufficiently high starting temperature, is used to return the plant from a state of production interruption (for example after a shutdown due to maintenance, due to a lack of feedstocks or due to a lack of demand for the isocyanate prepared in the plant) to the target state, i.e. regular operation.

BACKGROUND

Isocyanates are prepared in large volumes and serve mainly as starting materials for the preparation of polyurethanes. They are usually prepared by reacting the corresponding amines with phosgene, using phosgene in a stoichiometric excess. The reaction of the amines with the phosgene can be effected either in the gas phase or in the liquid phase, wherein the reaction may be conducted discontinuously or continuously. The phosgenation reaction—in the case of gas phase phosgenation after the quench of the gaseous reaction product obtained at first—gives a liquid phase comprising the desired isocyanate.

Processes for preparing organic isocyanates from primary amines and phosgene have been widely described previously; reference is made to the following documents on a purely exemplary basis:

DE-A-34 03 204 describes a continuous process for preparing organic polyisocyanates, in which elevated temperatures of 100 to 220° C. are established in a reaction involving partial circulation at a pressure of 5 to 100 bar.

DE-A-17 68 439 describes a process for continuously preparing organic isocyanates, in which the amine and phosgene feedstocks are first preheated and then the preheated constituents are combined in the reaction zone under high pressures and reacted under isothermal conditions, i.e. under heat exchange with the environment.

DE-A-102 22 968 describes a process for continuously preparing polyisocyanates by reacting primary amines with phosgene, in which the reaction is conducted in a cascade of temperature-adjustable reaction tubes of different size.

EP 1 873 142 A1 describes a three-stage process regime in which the pressure between the first stage of a mixer and the second stage of a first phosgenation reactor remains the same or rises and, in the third stage, an apparatus for phosgene removal, the pressure is lower than in the second stage. The reaction can be run adiabatically or isothermally.

Of interest on the industrial scale are both aromatic isocyanates, such as methylene diphenylene diisocyanate (MMDI henceforth—"monomeric MDI"), mixtures of MMDI and polymethylene polyphenylene polyisocyanates (the latter are the higher homologues of MMDI, referred to henceforth as PMDI, "polymeric MDI") or tolylene diisocyanate (TDI), and aliphatic isocyanates, for example pentane 1,5-diisocyanate (PDI), hexamethylene 1,6-diisocyanate (HDI) or isophorone diisocyanate (IPDI). In addition, isocyanates having benzylic isocyanate groups are also important; particular mention should be made here of xylylene diisocyanate (XDI). The present invention is especially concerned with the preparation of methylene diphenylene diisocyanates and polymethylene polyphenylene polyisocyanates (collectively called MDI henceforth).

In the majority of the known processes, the desired reaction temperature is established using temperature-controllable reactors in different variants (jacket heating, heating by heat exchangers or special reactor internals). In the isocyanate synthesis by phosgenation of amines, however, the external control of the temperature of the reactors often constitutes a problem since the high temperatures of the reactor wall surfaces promote or even actually cause the formation of by-products, which then adversely affect the yield and/or product properties. Moreover, deposits are then formed in the reactor, which necessitate regular shutdown and cleaning of the reactors. But this leads to a loss of plant capacity and hence to an economic disadvantage. Furthermore, the heat carrier systems incur additional capital costs, which likewise worsens the economic viability of the process. To solve these problems, EP 1 616 857 A1 proposes a two-stage process regime in which in a first stage a) amine and phosgene are reacted in an adiabatic reaction, where the reaction temperature is limited to values between 100 and 220° C. by setting the absolute pressure in the reactor specifically to values between 8 and 50 bar by decompression, and keeping the temperature at values between 100 and 220° C. until a conversion of phosgene of at least 80% has been attained, and then in a second stage b) decompressing the reaction mixture from the first stage to absolute pressures in the range from 1 to 15 bar and continuing conversion at temperatures between 90 and 240° C., typically with supply of heat. Such a process regime can be referred to as an adiabatic-isothermal process regime. What is essential to the process described is the adjustment of the reaction temperature in the adiabatically operated reactor (100° C. to 220° C., preferably 115° C. to 180° C., more preferably 120° C. to 150° C.) via the pressure in this reactor. This adjustment via the pressure is carried out by controlled decompression by opening valves attached to the reactor, thus allowing portions of the reaction mixture to escape from the reactor (cf. paragraph [0016]). The reaction mixture that exits the adiabatically operated reactor is converted further in a second stage under isothermal conditions and decompressed to a pressure below that in the first stage (cf. paragraph [0019]). At the outlet of the isothermally operated reactor, a gas phase and a liquid phase containing the isocyanate are withdrawn separately therefrom.

European patent application EP 3 653 605 A1 relates to a process for preparing an isocyanate by reacting a primary amine with phosgene, comprising I) providing an amine solution and adjusting its temperature in a heat exchanger, II) providing a phosgene solution and adjusting its temperature in a heat exchanger, III) mixing the amine solution with the phosgene solution in a mixing unit, followed by IV)

further conversion in an adiabatically operated reaction zone and the removing of the gas phase formed as a result of the chemical reaction in a separation zone, V) decompressing the remaining liquid phase, VI) further conversion of the liquid phase remaining after decompression in an indirectly heated reaction zone and VII) isolating the isocyanate from the reaction solution obtained therein, in which the temperature in the reaction zone and separation zone is adjusted by fixing a target value within a range from 110° C. to 145° C. for the temperature of the reaction mixture from step III) and using the actual temperature of the reaction mixture from step III) measured continuously or at intervals for closed-loop control of the temperature of the solution of the primary amine provided in step I) and/or of the temperature of the solution of phosgene provided in step II) by means of the heat exchangers used to adjust the temperature of each of these solutions.

European patent application EP 3 653 604 A1 relates to a process for preparing an isocyanate by reacting a primary amine with phosgene comprising I) providing an amine solution, II) providing a phosgene solution, III) mixing the amine solution with the phosgene solution in a mixing apparatus followed by IV) further reaction in an adiabatically operated reaction zone and separation of the gas phase formed as a result of the chemical reaction in a separation zone, v) two- to three-stage decompression of the remaining liquid phase, VI) further reaction of the liquid phase remaining after the final decompression stage in an indirectly heated reaction zone and VII) isolation of the isocyanate from the reaction solution obtained therein.

The quality of a process for preparing isocyanates is firstly defined by the content of unwanted by-products in the product of the process. Secondly, the quality of a process is defined in that the whole operation of start-up and production in regular operation until the shutdown of the process can be executed without technical production outage and without problems that would necessitate intervention in the operation, and that there are no losses of feedstocks, intermediates or end product. Against this backdrop, international patent application WO 2015/144658 A1 is concerned with a process for preparing isocyanates by phosgenating the corresponding amines, in which problems resulting from the formation of deposits in apparatuses in the reaction section during the start-up and shutdown of the process are avoided by chemical engineering measures, especially the assurance of a very large excess of phosgene over the amine to be phosgenated during the critical start-up and shutdown steps of the process. To this end, a continuous process for preparing an isocyanate by reacting the corresponding amine with phosgene in an inert solvent is proposed, where said process comprises successive performance of the steps (A) start-up of continuous production, (B) continuous production and (C) shutdown of continuous production, wherein in step (A)

a mixing zone and a reaction zone arranged downstream thereof is initially (i) at least partially charged only with inert solvent, then heated to the desired reaction temperature and then additionally charged with phosgene but not with amine, or (ii) at least partially charged with inert solvent and phosgene without the amine and then heated to the desired reaction temperature;

only subsequently is the reaction zone continuously supplied with the amine and further phosgene and further inert solvent via the mixing zone;

and wherein in step (C) continuous production is shut down by initially terminating only the supply of the amine while continuous supply of phosgene and inert solvent is continued. This document does not go into the details of a two-stage adiabatic-isothermal process mode.

However, experience has taught that the findings gained from "conventional" phosgenation processes cannot simply be transferred to the two-stage adiabatic-isothermal process mode. The present invention is based on the finding that a two-stage adiabatic-isothermal phosgenation process requires that several factors be simultaneously fulfilled to allow problem-free startup. These include in particular sufficiently high starting pressure and a sufficiently high (but not excessively high) starting temperature.

DETAILED DESCRIPTION

Taking these findings into account the present invention provides the following:

a process for operating a plant for continuous preparation of an isocyanate by reaction of a primary amine A with phosgene P while maintaining a stoichiometric excess of phosgene based on the amino groups of the primary amine in the presence of a solvent S in the liquid phase, wherein the plant comprises the following plant parts:
(I) a first mixing apparatus configured for mixing primary amine A and solvent S to afford an amine solution AS,
(I) a second mixing apparatus configured for mixing phosgene P and solvent S to afford a phosgene solution PS,
(III) a third mixing apparatus configured for mixing the amine solution and the phosgene solution to afford a reaction mixture,
(IV) a first reaction space configured for adiabatic reaction of the reaction mixture and a decompression space arranged downstream of the reaction space configured to form a first liquid phase and a first gaseous phase (wherein the reaction space and the decompression space are arranged either (a) in two different apparatuses, namely a first reactor and a first decompression apparatus, or (b) in a common apparatus which in its entirety constitutes a first reactor),
(V) a (in case (a): second) decompression apparatus configured for decompressing the first liquid phase to form a second liquid phase and a second gaseous phase (=decompression space of plant part (V) which is arranged in a dedicated apparatus),
(VI) a second reaction space configured for isothermal reaction of the second liquid phase to form a third liquid phase and a third gaseous phase (=second reactor),
(VII) a workup unit to obtain the isocyanate from the third liquid phase;

wherein the process in a target state (regular operation) comprises the continuous reaction
of the amine solution in a target concentration of amine in the amine solution of $c(A)_{TARGET}$ and a target flow rate of the amine solution of $\dot{m}(AS)_{TARGET}$ which results from a target flow rate of amine of $\dot{m}(A)_{TARGET}$ and a first target flow rate of solvent of $\dot{m}(SA)_{TARGET}$,
with the phosgene solution in a target concentration of phosgene in the phosgene solution of $c(P)_{TARGET}$ and a target flow rate of the phosgene solution of $\dot{m}(PS)_{TARGET}$ which results from a target flow rate of phosgene of $\dot{m}(P)_{TARGET}$ and a second target flow rate of solvent of $\dot{m}(SP)_{TARGET}$, and wherein
starting from a state in which no amine solution is supplied to the third mixing apparatus (i.e. the instantaneous flow rate of amine solution ṁ(AS) is zero and the production of isocyanate is thus interrupted) the following steps are performed to achieve the target state:

(i) continuously supplying
  (a) phosgene solution having a temperature in the range from 100° C. to 125° C., preferably 100° C. to 105° C., at the target concentration c(P)$_{TARGET}$ and the target flow rate ṁ(PS)$_{TARGET}$ from the second mixing apparatus and (simultaneously with, before or after)
  (b) solvent (without amine) having a temperature in the range from 70° C. to 100° C., preferably 90° C. to 95° C., at the first target flow rate ṁ(SA)$_{TARGET}$ from the first mixing apparatus
  into the third mixing apparatus and from there through the first reaction space, the decompression space, the decompression apparatus and the second reaction space into the workup unit,
(ii) starting the continuous supply of amine into the first mixing apparatus, through which the stream of solvent established in step (i)(b) continues to flow, thus forming an amine solution, at a starting flow rate of amine of ṁ(A)$_{START}$ which is less than the target flow rate of amine ṁ(A)$_{TARGET}$, so that a temperature of the amine solution exiting the first mixing apparatus in the range from 85° C. to 105° C., preferably 95° C. to 100° C., results, and a temperature of the reaction mixture exiting the third mixing apparatus in the range from 130° C. to 145° C., preferably 138° C. to 142° C. (=starting temperature), is obtained, wherein the point in time of starting the continuous supply of amine A into the first mixing apparatus is chosen such that upon first contacting of the amine solution and the phosgene solution in the third mixing apparatus the pressure in the decompression space of plant part (IV) is in the range from 16 to 25 bar, preferably 16 bar to 20 bar (=starting pressure),
(iii) increasing the flow rate of amine from ṁ(A)$_{START}$ to ṁ(A)$_{TARGET}$ (in steps or continuously) and simultaneously reducing the temperature of the phosgene solution withdrawn from the second mixing apparatus to a value in the range from 0° C. to 10° C., preferably 0° C. to 5° C., in such a way that the temperature of the reaction mixture exiting the third mixing apparatus remains in the range established in step ii) and the pressure in the decompression space of plant part (IV) increases to a value in the range from 20 bar to 30 bar, preferably 20 bar to 25 bar,
(iv) after achieving the target flow rate of amine (i.e. ṁ(A)=ṁ(A)$_{TARGET}$):
reducing the temperature of the amine solution withdrawn from the first mixing apparatus to a value in the range from 50° C. to 80° C., preferably 50° C. to 60° C., so that in the target state a temperature of the reaction mixture exiting the third mixing apparatus in the range from 125° C. to 135° C., preferably 128° C. to 132° C., results and the pressure in the decompression space of plant part (IV) remains in the range from 20 bar to 30 bar, preferably 20 bar to 25 bar.

Here and hereinbelow all pressures are to be understood as meaning absolute pressures.

According to the invention, phosgene, based on the amino groups of the primary amine, is used in a "stoichiometric excess". In theoretical terms, 1 mol of phosgene reacts with 1 mol of primary amino groups (1 R—NH$_2$+1 COCl$_2$→1R—NCO+2 HCl). An excess of phosgene of x % over primary amino groups therefore corresponds to a molar ratio n(phosgene)/n(—NH$_2$) (n=molar amount) of $$\frac{1+\frac{X}{100}}{1},$$

i.e., for example, $$\frac{1+\frac{40}{100}}{1}=1.40$$

with a 40% excess of phosgene or for example $$\frac{1+\frac{120}{100}}{1}=2.2$$

with a 120% excess of phosgene.

There now follows a brief summary of various possible embodiments of the invention.

In a first embodiment of the invention, which may be combined with all other embodiments, in step (i)
  the temperature of the phosgene solution is set to a value in the range from 100° C. to 105° C. and
  the temperature of the solvent is set to a value in the range from 90° C. to 95° C.;
wherein in step (ii)
  the pressure in the decompression space of plant part (IV) upon first contacting of the amine solution and the phosgene solution in the third mixing apparatus is in the range from 16 bar to 20 bar;
  a temperature of the amine solution exiting the first mixing apparatus in the range from 95° C. to 100° C. results and
  a temperature of the reaction mixture exiting the third mixing apparatus in the range from 138° C. to 142° C. is obtained;
and wherein in step (iii)
  the temperature of the phosgene solution withdrawn from the second mixing apparatus is reduced to a value in the range from 0° C. to 5° C. and
  the pressure in the decompression space of plant part (IV) increases to a value in the range from 20 bar to 25 bar;
and wherein in step (iv)
  the temperature of the amine solution withdrawn from the first mixing apparatus is reduced to a value in the range from 50° C. to 60° C.,
  in the target state a temperature of the reaction mixture exiting the third mixing apparatus in the range from 128° C. to 132° C. results and
  the pressure in the decompression space of plant part (IV) remains in the range from 20 bar to 25 bar.

In a second embodiment of the invention, which may be combined with all other embodiments, the pressure in the decompression space of plant part (IV), which is established in step (iii), is greater than the pressure in the decompression space of plant part (IV) at which the continuous supplying of amine into the first mixing apparatus is started in step (ii).

In a third embodiment of the invention, which is an alternative to the fourth embodiment described hereinbelow but may otherwise be combined with all other embodiments, the reaction space and the decompression space of plant part (IV) are arranged in two different apparatuses (a first reactor and a first decompression apparatus).

In a fourth embodiment of the invention, which is an alternative to the third embodiment described hereinabove but may otherwise be combined with all other embodiments, the reaction space and the decompression space of plant part (IV) are arranged in a common apparatus (which in its entirety constitutes the first reactor).

In a fifth embodiment of the invention, which may be combined with all other embodiments, in step (ii) the pressure in the decompression space of plant part (IV) is adjusted by outgassing phosgene, by addition of an inert gas (especially nitrogen) and/or by addition of hydrogen chloride.

In a sixth embodiment of the invention, which is a particular embodiment of the fifth embodiment, the pressure in the decompression space of plant part (IV) is adjusted by addition of hydrogen chloride, wherein the hydrogen chloride is withdrawn from the first, second and/or third gaseous phase.

In a seventh embodiment of the invention, which is an alternative to the eighth embodiment and ninth embodiment described hereinbelow but may otherwise be combined with all other embodiments, the performance of step (i)(b) is commenced simultaneously with step (i)(a).

In an eighth embodiment of the invention, which is an alternative to the seventh embodiment described hereinabove and the ninth embodiment described hereinbelow but may otherwise be combined with all other embodiments, the performance of step (i)(b) is commenced before step (i)(a).

In a ninth embodiment of the invention, which is an alternative to the seventh embodiment described hereinabove but may otherwise be combined with all other embodiments, the performance of step (i)(b) is commenced after step (i)(a).

In a tenth embodiment of the invention, which may be combined with all other embodiments, the workup unit comprises
- a first distillation apparatus configured for separating a phosgene-containing fourth gaseous phase from the third liquid phase to obtain a fourth liquid phase depleted in phosgene,
- a second distillation apparatus configured for separating a solvent-containing fifth gaseous phase from the fourth liquid phase to obtain a fifth liquid phase depleted in phosgene and solvent and
- a third distillation apparatus configured for obtaining the isocyanate from the fifth liquid phase.

In an eleventh embodiment of the invention, which may be combined with all other embodiments, after achieving the target state (and after a time of operating the plant in the target state) the continuous reaction of the amine solution with the phosgene solution is interrupted, wherein the interruption is effected by performing the following steps:
  (v) increasing the temperature of the phosgene solution and the temperature of the amine solution at flow rates of phosgene solution and amine solution unchanged relative to the target state;
  (vi) upon achieving a temperature of the reaction mixture exiting the third mixing apparatus in the range from >135° C. to 140° C.:
    terminating the supply of amine into the first mixing apparatus while maintaining the supply of solvent into the first mixing apparatus and maintaining the supply of phosgene solution into the second mixing apparatus;
  (vii) terminating the supply of phosgene into the second mixing apparatus while maintaining the supply of solvent into the second mixing apparatus and while maintaining the supply of solvent into the first mixing apparatus;
  (viii) after falling below a previously specified threshold concentration of phosgene in the solvent exiting the second mixing apparatus:
    terminating the supply of solvent into the second mixing apparatus; and
  (viii) terminating the supply of solvent into the first mixing apparatus.

In a twelfth embodiment of the invention, which is a particular configuration of the eleventh embodiment, in step (v) the temperature of the phosgene solution is increased to a value in the range from 100° C. to 125° C., wherein the temperature of the amine solution is increased to a value in the range from 100° C. to 125° C.

In a thirteenth embodiment of the invention, which is a particular configuration of the eleventh and twelfth embodiment, in step (vi) the amine supply is terminated as soon as the temperature of the reaction mixture exiting the third mixing apparatus is in the range from >135° C. to 137° C.

In a fourteenth embodiment of the invention, which may be combined with all other embodiments, the primary amine is selected from methylene diphenylene diamine (to afford methylene diphenylene diisocyanate), polymethylene polyphenylene polyamine (to afford polymethylene polyphenylene polyisocyanate), a mixture of methylene diphenylene diamine and polymethylene polyphenylene polyamine (to afford mixtures of methylene diphenylene diisocyanate and polymethylene polyphenylene polyisocyanate), tolylenediamine (to afford tolylene diisocyanate), xylylenediamine (to afford xylylene diisocyanate), pentane-1,5-diamine (to afford pentane 1,5-diisocyanate), hexamethylene-1,6-diamine (to afford hexamethylene 1,6-diisocyanate), isophoronediamine (to afford isophorone diisocyanate) and naphthyldiamine (to afford naphthyl diisocyanate).

The embodiments briefly outlined above and further possible embodiments of the invention are elucidated in more detail hereinafter. All embodiments may be combined with one another as desired unless otherwise stated or unambiguously apparent from the context.

Operation of the Plant in the Target State (Regular Operation)

Before elaborating on the particularities of the start-up of production according to the invention the operation of the plant in the target state (=regular operation) will be more particularly elucidated. As is immediately apparent to those skilled in the art many of the aspects outlined hereinbelow apply equally to the operating state of start-up (for example the type of apparatuses employed or the manner of temperature-controlling the reactants). For the avoidance of unnecessary repetition such aspects are not elaborated further hereinbelow.

The target state is achieved as soon as the flow rate of amine solution $\dot{m}(A)$ achieves the value $\dot{m}(AS)_{TARGET} = \dot{m}(A)_{TARGET} + \dot{m}(SA)_{TARGET}$ (wherein for the concentration c(A) of amine A in the amine solution AS $c(A) = c(A)_{TARGET}$). The production process for the isocyanate in the target state comprises the following steps (the process steps having Arabic numbering ((1), (2), etc.) described hereinbelow are performed in the plant parts having corresponding roman numbering ((I), (II), etc.)):
  (1) providing a solution of the primary amine A corresponding to the isocyanate in a solvent L using the first mixing apparatus;

(2) providing a solution of phosgene P in a solvent L using the second mixing apparatus;

(3) mixing the solution of the primary amine provided in step (1) and the solution of phosgene provided in step (2) in the third mixing apparatus to afford a reaction mixture having a temperature in the range from 125° C. to 135° C., preferably from 128° C. to 132° C., while maintaining a stoichiometric excess of phosgene based on the amino groups of the primary amine preferably in the range from 40% to 200% of theory, particularly preferably in the range from 40% to 120% of theory, very particularly preferably in the range from 50% to 100% of theory, and exceptionally preferably in the range from 50% to 75% of theory;

(4) passing the liquid reaction mixture obtained in step (3) through the first reaction space and through the first decompression space of plant part (IV) arranged downstream of the first reaction space to form the first liquid phase and the first gaseous phase which is under a pressure of 20 bar to 30 bar, preferably 20 bar to 25 bar, wherein the first reaction space and the decompression space are not heated and not cooled (i.e. are both operated adiabatically);

(5) (single or multi-stage) decompression of the first liquid phase withdrawn from the decompression space from step (4) in the decompression apparatus of the plant part (V) to form a second liquid phase and a second gaseous phase;

(6) passing the second liquid phase obtained in step (5) after decompression through the second reaction space to form the third liquid phase (containing isocyanate and solvent) and the third gaseous phase (containing hydrogen chloride and phosgene and generally also proportions of evaporated solvent) wherein the second reaction space is heated indirectly, i.e. is operated isothermally;

(7) working up the third liquid phase obtained in step (6) in the workup unit to recover the solvent and obtain the isocyanate.

Since the decompression zone of plant part (IV) is "arranged downstream" of the first reaction space, which in the terminology of the present invention is also to be understood as meaning an open fluidic connection of both zones, and since, moreover, the first reaction space and the decompression space of plant part (IV) are "not heated and not cooled" (=adiabatic process mode), every point of the first reaction space and the decompression space of plant part (IV) is at a temperature which, at a given temperature of the reaction mixture from step (3) and apart from heat losses through imperfect insulation of the apparatuses employed, is determined substantially by the reaction enthalpies of the chemical processes occurring (which are elucidated hereinbelow). The pressure established is also determined primarily by the chemical processes occurring. However, the decompression space of plant part (IV) is preferably provided with a pressure control valve for the gas phase formed and a liquid level control means for the liquid phase to be able to safely ensure that the pressure is in the abovementioned range (20 bar to 30 bar, preferably 20 bar to 25 bar). The temperature in step (4) thus ultimately depends on the temperature of the reaction mixture to be supplied to this step.

Step 1), the provision of the amine solution required for the phosgenation, may be effected by any methods known from the prior art. The amine to be used is determined by the isocyanate desired. The process of the invention is suitable in principle for preparation of any desired aromatic, aliphatic and araliphatic isocyanates. Preference is given to using the process according to the invention for preparing methylene diphenylene diisocyanate (from methylene diphenylene diamine), polymethylene polyphenylene polyisocyanate (from polymethylene polyphenylene polyamine), mixtures of methylene diphenylene diisocyanate and polymethylene polyphenylene polyisocyanate (these mixtures are also referred to henceforth as MDI and the starting amine mixtures as MDA), tolylene diisocyanate (from tolylenediamine), xylylene diisocyanate (from xylylenediamine), pentane 1,5-diisocyanate (from pentane-1,5-diamine), hexamethylene diisocyanate (from hexamethylenediamine), isophorone diisocyanate (from isophoronediamine) and naphthyl diisocyanate (from naphthyldiamine), more preferably methylene diphenylene diisocyanate, mixtures of methylene diphenylene diisocyanate and polymethylene polyphenylene polyisocyanate, and tolylene diisocyanate. The process according to the invention is most preferably suitable for preparation of methylene diphenylene diisocyanate and mixtures of methylene diphenylene diisocyanate and polymethylene polyphenylene polyisocyanate. Methylene diphenylene diisocyanate is also referred to as diamine of the diphenylmethane series. Polymethylene polyphenylene polyisocyanate is also referred to as polyamine of the diphenylmethane series.

Processes for preparing the amines mentioned are known to those skilled in the art and therefore do not need any further elucidation at this point.

In step (1), the amine to be phosgenated is dissolved in a solvent. A mixing apparatus known per se to those skilled in the art may be employed as the first mixing apparatus required for this purpose. Mixing tubes with static mixers as internals (often also referred to as static mixers for short) are especially suitable. Suitable solvents usable in accordance with the invention are solvents that are inert under the reaction conditions, for example monochlorobenzene, dichlorobenzene (especially the ortho isomer), dioxane, toluene, xylene, methylene chloride, perchloroethylene, trichlorofluoromethane or butyl acetate. The solvent is preferably essentially free of isocyanate (target mass fraction<100 ppm) and essentially free of phosgene (target mass fraction<100 ppm), and this should be noted when using recycling streams. Preference is therefore given to working by a process as described in EP 1 854 783 A2. The solvents can be used individually or in the form of any desired mixtures of the solvents mentioned by way of example. Preference is given to using monochlorobenzene (MCB) or ortho-dichlorobenzene (oDCB), most preferably monochlorobenzene (MCB).

A temperature of the resulting amine solution in the range from 50° C. to 80° C., particularly preferably 50° C. to 60° C., is intended. This may in principle be achieved by appropriate temperature control of the starting materials amine and solvent, while taking into account the enthalpy of solution. However, what is preferred in accordance with the invention, especially in addition to the recited temperature control of the starting materials, is provision of a heat exchanger downstream of the mixing of amine and solvent which allows specific adjustment of the amine solution to the desired temperature in the recited range and is thus able to heat or cool according to the temperature immediately downstream of the mixing of the starting materials. Heat exchangers known to those skilled in the art, such as especially shell and tube heat exchangers and plate heat exchangers, are suitable for this purpose.

Having regard to the amine concentration in the solution provided in step (1), it is preferable to adjust the mass fraction of primary amine based on the total mass of this solution to a value in the range from 25% to 50%, especially in the range from 30% to 45%.

Step 2), the provision of the phosgene solution required for the phosgenation, may likewise be effected by any methods known from the prior art. The same mixing apparatuses and solvents as described above for the primary amine are suitable. It is especially preferable to dissolve the primary amine in step (1) and phosgene in step (2) in the same solvent in each case, i.e. very particularly preferably in MCB. Processes for preparing phosgene are known to those skilled in the art and therefore do not need any further elucidation at this point.

A temperature of the resulting phosgene solution in the range from 0° C. to 10° C., preferably 0° C. to 5° C., is intended. This may in principle be achieved by appropriate temperature control of the starting materials phosgene and solvent, while taking into account the enthalpy of solution. However, what is preferred in accordance with the invention, especially in addition to the recited temperature control of the starting materials, is provision of a heat exchanger downstream of the mixing of phosgene and solvent which allows specific adjustment of the phosgene solution to the desired temperature in the abovementioned range and is thus able to heat or cool according to the temperature immediately downstream of the mixing of the starting materials. Suitable mixing units and solvents are the same as described above for the primary amine.

Having regard to the phosgene concentration in the solution provided in step (2), it is preferable to adjust the mass fraction of phosgene based on the total mass of this solution to a value in the range from 45% to 90%, especially in the range from 55% to 80%.

In step (3), the solution of the primary amine provided in step (1) and the solution of the phosgene provided in step (2) are mixed. Mixing apparatuses known per se to those skilled in the art, such as static or dynamic mixers, are suitable as the third mixing apparatus required for this purpose. Static mixers are characterized by the absence of moving parts; particular mention should be made here of mixing tubes with static mixers as internals (frequently also referred to as static mixers for short) or nozzles. By contrast, dynamic mixers contain moving parts, for example stirrer units. Particular mention should also be made here of the rotor-stator systems known from EP 0 830 894 A1 and EP 2 077 150 A1. Dynamic mixers, especially those of the rotor-stator type, are preferred for use in the present invention.

The mixing unit from step (3) is preferably not heated and not cooled, meaning that the temperature of the reaction mixture obtained is determined solely by the enthalpy of mixing and the enthalpy of the reactions that have already set in in the mixing unit. A transport conduit for the reaction mixture between the outlet of the third mixing apparatus and the inlet of the first reaction space is preferably likewise neither heated nor cooled, but is preferably thermally insulated.

According to the invention, in the mixing in step (3) a stoichiometric excess of phosgene based on the amino groups of the primary amine preferably in the range from 40% to 200% of theory, particularly preferably in the range from 40% to 120% of theory, very particularly preferably in the range from 50% to 100% of theory and exceptionally preferably in the range from 50% to 75% of theory is observed.

The first main part of the reaction to afford the isocyanate (apart from chemical reactions already commenced in the third mixing apparatus) is carried out in step (4), in particular under adiabatic conditions. This is to be understood as meaning that the reaction mixture that passes through step (4) is neither heated nor cooled during the reaction. The apparatuses used are insulated against heat losses and the temperature profile is therefore determined by the reaction enthalpy of the reactions occurring.

Without wishing to be bound to a particular theory it can be assumed that a plurality of reactions proceed simultaneously in step (4) (and in some cases already in step (3)). The primary amine reacts with phosgene to give the known carbamoyl chloride intermediate (exothermic reaction). The hydrogen chloride released here reacts with as yet unconverted amine to give amine hydrochloride (exothermic reaction), which dissolves in the solvent used (endothermic reaction). The cleavage of the carbamoyl chloride to give the desired isocyanate and hydrogen chloride also already takes place in part in step 4) (endothermic reaction). The change in temperature depends on the interplay of all these reactions. In general only a small change in temperature is observed in step (4), which suggests that there is a "balance" of exo- and endothermic reactions. In any case the reactions in step (4) result in the formation of a first gaseous phase which is separated from the remaining first liquid phase in the first decompression space of plant part (IV).

According to the invention it is possible to employ two separate apparatuses as the first reaction space and decompression space of plant part (IV), in which case in the terminology of the present invention the apparatus containing the first reaction space is referred to as the first reactor and the apparatus containing the first decompression space is referred to as the first decompression apparatus. A suitable first decompression apparatus is a gas-liquid separation vessel known per se to those skilled in the art (also known as a gas separator).

(b) It is likewise possible and preferred according to the invention to arrange the first reaction space and the first decompression space in a common apparatus which in the terminology of the present invention is then referred to in its entirety as the first reactor.

Regardless of whether variant (a) or variant (b) is used, suitable first reactors are customary phosgenation reactors known to those skilled in the art, such as especially upright tubular reactors (tube reactors; also referred to as tower reactors or reactor towers if the height-to-diameter ratio is relatively small). Such reactors can also be operated as bubble columns. In order to narrow the residence time distribution the first reaction chamber arranged in the first reactor may be segmented by internals known to those skilled in the art. The reaction mixture obtained in step (3) preferably flows through the first reactor from bottom to top. In the preferred case (b) the first decompression space is then the gas space in the upper region of the first reactor, from which the first liquid phase and the first gaseous phase are removed separately. The phase separation occurs spontaneously regardless of whether variant (a) or (b) is used.

In step (5) the first liquid phase obtained in step (4) is subjected to single- or multi-stage decompression, preferably to a pressure in the range from 1.0 bar to 20 bar, in the case of multi-stage decompression measured in the gas phase obtained in the final stage, which, in the terminology of the present invention, is referred to as the second gaseous phase. A suitable (in case (a): second) decompression apparatus is a gas-liquid separation vessel known per se to those skilled in the art (also known as a gas separator). In the case of multi-stage decompression in step (5), a corresponding number of such gas separators is arranged in series, wherein in the terminology of the present invention the entirety of all gas-liquid separation vessels then constitutes the decompression apparatus of plant part (V). A gas phase containing hydrogen chloride and unconverted phosgene is formed in every stage. In this multi-stage decompression the liquid phase obtained after decompression of the first stage is the feedstock for the second stage, and so on.

It is possible to arrange the gas-liquid separation vessel intended for the decompression (in the case of a multistage decompression that used for the final decompression) and the second (indirectly heated) reaction space from step (6) in a common apparatus. One example of a possible embodiment is described below.

In Step (6) the second liquid phase obtained in step (5) is further reacted in the second reaction space to form the third liquid phase containing the desired isocyanate and the (hydrogen chloride- and phosgene-containing) third gaseous phase ("isothermal process mode"). This may be carried out in heatable reactors known to those skilled in the art. Especially suitable for this purpose are shell and tube reactors (in a vertical arrangement). The second liquid phase may be run through the interior of the tubes of the shell and tube reactor (tube interior) or through the space between the tubes of the shell and tube reactor which is externally delimited by the reactor wall that encases the bundle of tubes (tube exterior). The heating medium—a heat carrier oil, a salt melt, steam or the like—is then run through the respective other space, such that it does not come into physical contact with the liquid process product to be converted (indirect heating). The liquid phase obtained in step (4) preferably runs through the vertically arranged shell and tube reactor from top to bottom. In the preferred embodiment of the invention, with integration of the gas-liquid separation vessel provided for the decompression of step (5)/for the last decompression stage of step (5) in the apparatus in which the second reaction space from step (5) is arranged, the gas-liquid phase separation is then carried out in a cap at the top of the shell and tube reactor.

In Step (7), the workup of the third liquid phase obtained in step (6) in the workup unit, the desired isocyanate is isolated with recovery of the solvent. This step may be performed by processes known per se from the prior art and generally comprises a dephosgenation, a solvent separation and a final purification. The third liquid phase is preferably initially freed as completely as possible of dissolved phosgene (which is separated as the fourth gaseous phase) in a first distillation apparatus (the so-called "dephosgenation column") to obtain a fourth liquid phase depleted in phosgene. This is preferably freed as completely as possible of solvent (which is separated as the fifth gaseous phase) in a second distillation apparatus (the so-called "solvent column") to obtain a fifth liquid phase depleted in phosgene. Recovered phosgene and solvent are advantageously recycled.

The fifth liquid phase is subjected to final purification in a third distillation apparatus which includes homolog separation if necessary. Depending on the type of isocyanate the final purification may also comprise an isomer separation. In a preferred embodiment, the present invention is directed to the preparation of methylene diphenylene diisocyanate and of mixtures of methylene diphenylene diisocyanate and polymethylene polyphenylene polyisocyanate. In this case the fifth liquid phase, which contains the entirety of the crude isocyanate (homologue and isomer) mixture, is preferably initially supplied to a distillative homologue separation (the so-called "polymer separation") to obtain a distillate of methylene diphenylene diisocyanate (which contains at most traces of polymethylene polyphenylene polyisocyanate) and a bottoms product of polymethylene polyphenylene polyisocyanate and methylene diphenylene diisocyanate (in which the proportion of methylene diphenylene diisocyanate is reduced relative to the fifth liquid phase in accordance with the amount of methylene-diphenylene diisocyanate distilled off in the homologue separation). The distillate of methylene diphenylene diisocyanate is freed of low-boiling and high-boiling impurities in at least one further distillation step and separated into various isomeric fractions. The isomer separation preferably comprises obtaining a fraction of 4,4'-methylene diphenylene diisocyanate and a fraction of a mixture of 2,4'-methylene diphenylene diisocyanate and 4,4'-methylenediphenylene diisocyanate. Step (7), which is only briefly outlined here, is described in detail in the prior art; reference is made, for example, to WO 2017/050776 A1.

Steps (4), (5) and (6) afford gaseous phases (namely the first, second and third gaseous phase) containing hydrogen chloride and phosgene and any entrained solvent. These gaseous phases are preferably likewise subjected to workup for recovery of products of value. The workup especially serves to separate phosgene and hydrogen chloride from one another and may be effected for example by absorption of the phosgene in a solvent or by distillative separation after compression and liquefaction. The hydrogen chloride gas obtained is suitable for further oxidation to chlorine which is required for preparation of the phosgene required for step (2). The oxidation may proceed electrolytically or catalytically with oxygen (so-called Deacon process). A portion of the recovered hydrogen chloride may also be used to establish the starting pressure as elucidated hereinbelow. Recovered phosgene, optionally containing solvent, may also be used in step (2).

In any case it is advantageous to adjust the gaseous phases obtained in steps (4), (5) and (6) to a common pressure and to combine them upstream of the workup.

This may in principle be effected by decompressing all gaseous phases to the lowest pressure (i.e. to the pressure of the third gaseous phase obtained in step (6)) or an even lower pressure and then further purifying them. This procedure is preferred especially in the case of workup by absorption.

Start-Up of Production (Transferring the Plant into the Target State)

It is necessary for the start-up process of the present invention that when starting from a state in which no amine solution is supplied to the third mixing apparatus (i.e. the instantaneous flow rate of amine solution ṁ(AS) is equal to zero and the production of isocyanate is thus interrupted) the target state is achieved (the plant is transferred into the regular operation elucidated hereinabove) by performing steps (i) to (iv) described hereinabove. In a preferred embodiment, in step (i)
the temperature of the phosgene solution is set to a value in the range from 100° C. to 105° C. and
the temperature of the solvent is set to a value in the range from 90° C. to 95° C.;
wherein in step (ii) the procedure is such that:
the pressure in the decompression space of plant part (IV) upon first contacting of the amine solution and the phosgene solution in the third mixing apparatus is in the range from 16 bar to 20 bar;
a temperature of the amine solution exiting the first mixing apparatus in the range from 95° C. to 100° C. results and a temperature of the reaction mixture exiting the third mixing apparatus in the range from 138° C. to 142° C. is obtained;

wherein furthermore in step (iii) the procedure is such that:

the temperature of the phosgene solution withdrawn from the second mixing apparatus is reduced to a value in the range from 0° C. to 5° C. and the pressure in the decompression space of plant part (IV) increases to a value in the range from 20 bar to 25 bar;

and wherein finally in step (iv) the procedure is such that:

the temperature of the amine solution withdrawn from the first mixing apparatus is reduced to a value in the range from 50° C. to 60° C., in the target state a temperature of the reaction mixture exiting the third mixing apparatus in the range from 128° C. to 132° C. results and the pressure in the decompression space of plant part (IV) remains in the range from 20 bar to 25 bar.

Preferably, for the pressure in the decompression space of plant part (IV), which is established in step (iii) a value is chosen that is higher than for the pressure in this decompression space at which the continuous supply of amine into the first mixing apparatus is commenced in step (ii). This ensures that the reaction does not come to a halt even when the phosgene excess is reduced as a result of the successive increasing of the concentration of the aniline solution supplied.

Depending on the chosen conditions of pressure and temperature in step (ii) dissolved phosgene is partially converted from the liquid phase into the gaseous state (outgassing). This causes the pressure in the decompression space of plant part (IV) to increase. In the process according to the invention it is provided that the amine solution and the phosgene solution only contact one another for the first time in the third mixing apparatus when the pressure in the decompression space of plant part (IV) is in the range from 16 bar to 25 bar, preferably 16 bar to 20 bar (starting pressure). The residence time—easily determinable for a given plant—of the amine solution from commencement of amine supply into the first mixing apparatus until first arrival of amine solution in the third mixing apparatus must be taken into account here. In addition to the pressure which results from the given boundary conditions without taking any particular measures, the pressure in the decompression plant part (IV) can also be adjusted by addition of an inert gas (in particular nitrogen) and/or by addition of hydrogen chloride. Hydrogen chloride may advantageously be withdrawn from the first, second and/or third gaseous phase, wherein such hydrogen chloride may if necessary also originate from an earlier production period for preparation of the isocyanate (intermediately stored in a suitable reservoir vessel).

Once step (iv) has been carried out the plant is in regular operation and can continue to be operated until the next production interruption as described hereinabove.

Shutdown of Production (Transferring the Plant from the Target State into a State of Plant Shutdown)

Any continuous production must be interrupted from time to time, be it because demand for the product produced has fallen or works (maintenance, overhaul and the like) on the plant are required. To this end it is preferable in the context of the present invention to proceed as follows:

In the case of flow rates unchanged relative to the target state (regular operation) the temperatures of the phosgene and amine solutions are initially increased. This has the effect of avoiding a temperature drop after the third mixing apparatus which could potentially bring about a contamination of the reactor. The temperature of the phosgene solution is increased from its target value for regular operation in the range from 0° C. to 10° C. to preferably to a value in the range from 100° C. to 125° C. The temperature of the amine solution is increased from its target value for regular operation in the range from 50° C. to 80° C. preferably to a value in the range from 100° C. to 125° C. This causes the temperature of the reaction mixture exiting the third mixing apparatus to increase from its target value in regular operation in the range from 125° C. to 135° C. to higher values. Upon achieving the temperature in the range from >135° C. to 140° C., preferably >135° C. to 137° C., the further supply of amine is interrupted while, by contrast, a flow of solvent through the first mixing apparatus into the third mixing apparatus is maintained, wherein this flow may also be higher or lower, in particular higher, than in regular operation (to control the temperature at the outlet of the third mixing apparatus). The temperature at the outlet of the third mixing apparatus falls with increasing dilution. This temperature is preferably maintained in the range of 115° C. to 125° C.

In order to flush the employed apparatuses and to react any amine still present therein, even after shutdown of the amine supply phosgene solution continues to be added via the second mixing apparatus, the third mixing apparatus and the apparatuses arranged downstream thereof preferably for a period in the range from 15 minutes to 3 hours, for example for a period of 20 minutes. Once this period has elapsed the phosgene supply is also interrupted and only solvent for diluting/flushing the phosgene solution still present in the apparatuses is pumped via the second mixing apparatus into the third mixing apparatus and from said apparatus into the apparatuses arranged downstream thereof. As soon as the phosgene has been sufficiently displaced (i.e. to a predetermined threshold concentration) the metered addition of solvent via the second mixing apparatus is interrupted. Thereafter (especially 10 minutes to 20 minutes, for example 15 minutes, thereafter) the supply of solvent via the first mixing apparatus is also interrupted.

The extent to which phosgene must be depleted in the plant depends on the circumstances. In the case of a comparatively brief production interruption without the performance of works on phosgene-conducting plant parts, complete displacement of the phosgene is generally unnecessary. If the plant is to be taken off-line for an extended period or works on phosgene-conducting plant parts are necessary it goes without saying that the phosgene must be completely displaced and/or decomposed by subsequent cleaning steps such as for example a reaction with ammonia.

The invention is hereinbelow more particularly elucidated with reference to examples.

EXAMPLES

Percentage concentrations are percentages by mass based on the total mass of the respective material stream. For the definition of phosgene excess see elucidations above.

The examples were performed in a mini-plant in which in the target state an amine solution from a first mixing apparatus composed of about 11.6 kg/h of MDA and about 27 kg/h of MCB were mixed with a phosgene solution from a second mixing apparatus at a phosgene excess of about 60% in a dynamic mixer (third mixing apparatus) and the resulting mixture was supplied to an adiabatically operated bubble column reactor (adiabatically operated reaction space, first reactor). The product mixture from the bubble column reactor was decompressed in two decompression apparatuses (the first decompression apparatus corresponding to the decompression space of plant part (IV) and the second decompression apparatus to plant part (V)) and the obtained liquid phase was supplied to a falling film evaporator (isothermally operated reaction space, second reactor). The liquid phase obtained therein was supplied to a distillation column in which MDI was obtained as the bottoms stream and a phosgene- and hydrogen chloride-containing gas phase was obtained as the tops stream. The gas phases obtained in the two decompression apparatuses were combined with this gas phase.

Example 1 (Comparative—Excessively Low Starting Pressure)

A 60% phosgene solution was prepared by mixing monochlorobenzene (MCB) and phosgene and conveyed from the second mixing apparatus to the third mixing apparatus at a mass flow $\dot{m}$=51.4 kg/h and a temperature of 120° C. MCB heated to 95° C. was subsequently conveyed via the first mixing apparatus into the third mixing apparatus at a mass flow $\dot{m}$=30 kg/h. The supply of MDA into the second mixing apparatus and from there into the third mixing apparatus was then commenced. This resulted in an amine solution temperature of 100° C. Start-up was effected at an amine solution concentration of 25% (corresponding to an amount of about 9.7 kg/h of MDA and about 28.9 kg/h of MCB). After about 7 minutes the amine solution reached the third mixing apparatus and the reaction commenced. The pressure in the decompression space at this point in time (=starting pressure) was 15 bar. As a result of onset of the reaction the temperature at the outlet of the third mixing apparatus increased from 100° C. to 135° C. over 5 minutes. As soon as the temperature increase stopped, the concentration of the amine solution was increased to 30% (corresponding to an amount of about 11.6 kg/h of MDA and about 27 kg/h of MCB). As a result of this change the temperature at the outlet of the third mixing apparatus increased to 140° C. The pressure in the decompression space increased to 20 bar.

While taking account of the temperature at the outlet of the third mixing apparatus (this should not fall below 135° C.) the phosgene solution temperature was reduced from 120° C. to 0° C. over 90 minutes. About 10 minutes after commencing reduction of the phosgene solution temperature the phosgene excess was reduced in stepwise fashion from 210% to 60% by successive increasing of the mass flow and the concentration of the amine solution (final value about 60 kg/h of amine solution having a concentration of 30%). The pressure in the decompression space simultaneously increased to 26 bar. Reducing the phosgene excess (while maintaining a temperature at the outlet of the third mixing apparatus of at least 135° C.) took about 60 minutes.

Still during reduction of the phosgene excess, a reduced gas evolution in the decompression space was observed. At a pressure of 24 bar in the decompression space and a phosgene excess of about 60% a temperature drop at the outlet of the third mixing apparatus occurred (indicating that the reaction had gone "dormant"). The experiment had to be terminated to avoid contamination of the reactor.

Example 2 (Comparative—Starting Pressure Sufficiently High, but Temperature at Outlet of Third Mixing Apparatus Excessively High)

A 60% phosgene solution was prepared by mixing monochlorobenzene (MCB) and phosgene and conveyed from the second mixing apparatus to the third mixing apparatus at a mass flow $\dot{m}$=51.4 kg/h and a temperature of 120° C. MCB heated to 80° C. was subsequently conveyed via the first mixing apparatus into the third mixing apparatus at a mass flow $\dot{m}$=30 kg/h. The supply of MDA into the second mixing apparatus and from there into the third mixing apparatus was then commenced. This resulted in an amine solution temperature of 95° C. Start-up was effected at an amine solution concentration of 25% (corresponding to an amount of about 9.7 kg/h of MDA and about 28.9 kg/h of MCB). After about 7 minutes the amine solution reached the third mixing apparatus and the reaction commenced. The pressure in the decompression space before commencement of the reaction was 15 bar and was increased to 20 bar (=starting pressure) in good time before first contacting of MDA and phosgene by nitrogen addition. As a result of onset of the reaction the temperature at the outlet of the third mixing apparatus increased from 100° C. to 135° C. over 5 minutes. As soon as the temperature increase stopped, the concentration of the amine solution was increased to 30% (corresponding to an amount of about 11.6 kg/h of MDA and about 27 kg/h of MCB). As a result of this change the temperature at the outlet of the third mixing apparatus increased to 140° C. As a consequence of the progress of the reaction the pressure in the decompression space increased to 26 bar over 10 minutes.

Without taking account of the temperature at the outlet of the third mixing apparatus the phosgene solution temperature was reduced from 120° C. to 0° C. over 90 minutes. About 10 minutes after commencing reduction of the phosgene solution temperature the phosgene excess was reduced in stepwise fashion from 210% to 60% by successive increasing of the mass flow and the concentration of the amine solution (final value about 60 kg/h of amine solution having a concentration of 30%). Reducing the phosgene excess (in turn without taking account of the temperature at the outlet of the third mixing apparatus) took about 30 minutes. There was a temperature increase at the outlet of the third mixing apparatus to 150° C. which was accompanied by increased solids formation and a coating of the internal reactor walls with solid. The experiment was terminated to avoid further contamination of the reactor.

Example 3 (Inventive—Starting Pressure Sufficiently High and Temperature at the Outlet of the Third Mixing Apparatus in the Suitable Range)

A 60% phosgene solution was prepared by mixing monochlorobenzene (MCB) and phosgene and conveyed from the second mixing apparatus to the third mixing apparatus at a mass flow $\dot{m}$=51.4 kg/h and a temperature of 120° C. MCB heated to 80° C. was subsequently conveyed via the first mixing apparatus into the third mixing apparatus at a mass flow $\dot{m}$=30 kg/h. The supply of MDA into the second mixing apparatus and from there into the third mixing apparatus was then commenced. This resulted in an amine solution temperature of 95° C. Start-up was effected at an amine solution concentration of 25% (corresponding to an amount of about 9.7 kg/h of MDA and about 28.9 kg/h of MCB). After about 7 minutes the amine solution reached the third mixing apparatus and the reaction commenced. The pressure in the decompression space before commencement of the reaction was 15 bar and was increased to 20 bar (=starting pressure) in good time before first contacting of MDA and phosgene by nitrogen addition. As a result of onset of the reaction the temperature at the outlet of the third mixing apparatus increased from 100° C. to 135° C. over 5 minutes. As soon as the temperature increase stopped, the concentration of the amine solution was increased to 30% (corresponding to an amount of about 11.6 kg/h of MDA and about 27 kg/h of MCB). As a result of this change the temperature at the outlet of the third mixing apparatus increased to 140° C. As a consequence of the progress of the reaction the pressure in the decompression space increased to 26 bar over 10 minutes.

While taking account of the temperature at the outlet of the third mixing apparatus (this should remain at about 140° C.) the phosgene solution temperature was reduced from 120° C. to 0° C. over 90 minutes. About 10 minutes after commencing reduction of the phosgene solution temperature the phosgene excess was reduced in stepwise fashion from 210% to 60% by successive increasing of the mass flow and the concentration of the amine solution (final value about 60 kg/h of amine solution having a concentration of 30%). Reducing the phosgene excess (while maintaining a temperature at the outlet of the third mixing apparatus of about 140° C.) took about 30 minutes.

After achieving a phosgene excess of 60% the amine solution temperature was reduced from 95° C. to 55° C. over 30 minutes. Under these conditions (amine solution temperature 55° C., phosgene solution temperature 0° C., phosgene excess 60%, pressure in the decompression space 26 bar) a temperature of the reaction mixture at the outlet of the third mixing apparatus of 130° C. results. The system is thus in the target state. The period from commencement of start-up until achievement of the target state was about 4 hours.

The invention claimed is:

1. A process for operating a plant for continuous preparation of an isocyanate by reaction of a primary amine A with phosgene P while maintaining a stoichiometric excess of P based on the amino groups of A in the presence of a solvent S in the liquid phase,
wherein the plant comprises:
(I) a first mixing apparatus configured for mixing A and S to provide an amine solution AS,
(II) a second mixing apparatus configured for mixing P and S to provide a phosgene solution PS,
(III) a third mixing apparatus configured for mixing AS and PS to provide a reaction mixture,
(IV) a first reaction space configured for adiabatic reaction of the reaction mixture and a decompression space arranged downstream of the reaction space configured to form a first liquid phase and a first gaseous phase,
(V) a decompression apparatus for decompressing the first liquid phase to form a second liquid phase and a second gaseous phase,
(VI) a second reaction space configured for isothermal reaction of the second liquid phase to form a third liquid phase and a third gaseous phase, and
(VII) a workup unit to obtain the isocyanate from the third liquid phase;
wherein in a target state the process comprises the continuous reaction of AS in a target concentration of A in AS of $c(A)_{TARGET}$ and a target flow rate of AS of $\dot{m}(AS)_{TARGET}$ which results from a target flow rate of A of $\dot{m}(A)_{TARGET}$ and a first target flow rate of S of $\dot{m}(SA)_{TARGET}$, with PS in a target concentration of P in PS of $c(P)_{TARGET}$ and a target flow rate of PS of $\dot{m}(PS)_{TARGET}$ which results from a target flow rate of P of $\dot{m}(P)_{TARGET}$ and a second target flow rate of S of $\dot{m}(SP)_{TARGET}$,
and wherein starting from a state in which no AS is supplied to the third mixing apparatus the following steps are performed to achieve the target state:
(i) continuously supplying (a) PS having a temperature of 100° C. to 125° at $c(P)_{TARGET}$ and $\dot{m}(PS)_{TARGET}$ from the second mixing apparatus and (b) S having a temperature of 70° C. to 100° C. at $\dot{m}(SA)_{TARGET}$ from the first mixing apparatus into the third mixing apparatus and from there through the first reaction space, the decompression space, the decompression apparatus and the second reaction space into the workup unit,
(ii) starting the continuous supply of A into the first mixing apparatus, through which the stream of S established in step (i)(b) continues to flow, thus forming AS, at a starting flow rate of A of $\dot{m}(A)_{START}$ which is less than $\dot{m}(A)_{TARGET}$, so that a temperature of AS exiting the first mixing apparatus of 85° C. to 105° C. results and a temperature of the reaction mixture exiting the third mixing apparatus of 130° C. to 145° C. is obtained, wherein the point in time of starting the continuous supply of A into the first mixing apparatus is chosen such that upon first contacting of AS and PS in the third mixing apparatus the pressure in the decompression space of plant part (IV) is 16 to 25 bar,
(iii) increasing the flow rate of A from $\dot{m}(A)_{START}$ to $\dot{m}(A)_{TARGET}$ and simultaneously reducing the temperature of PS withdrawn from the second mixing apparatus to a value of 0° C. to 10° C. in such a way that the temperature of the reaction mixture exiting the third mixing apparatus remains at 130° C. to 145° C. and the pressure in the decompression space of plant part (IV) is 20 bar to 30 bar, and
(iv) after achieving $\dot{m}(A)_{TARGET}$, reducing the temperature of AS withdrawn from the first mixing apparatus to 50° C. to 80° C. so that in the target state a temperature of the reaction mixture exiting the third mixing apparatus of 125° C. to 135° C. results and the pressure in the decompression space of plant part (IV) remains at 20 bar to 30 bar.

2. The process as claimed in claim 1,
wherein in step (i)
the temperature of PS is set to a value of 100° C. to 105° C., and
the temperature of S is set to a value of 90° C. to 95° C.;
wherein in step (ii)
the pressure in the decompression space of plant part (IV) upon first contacting of AS and PS in the third mixing apparatus is 16 bar to 20 bar;
a temperature of AS exiting the first mixing apparatus of 95° C. to 100° C. results, and
· a temperature of the reaction mixture exiting the third mixing apparatus of 138° C. to 142° C. is obtained;
wherein in step (iii)
the temperature of PS withdrawn from the second mixing apparatus is reduced to 0° C. to 5° C., and
the pressure in the decompression space of plant part (IV) increases to 20 bar to 25 bar;
and wherein in step (iv)
the temperature of AS withdrawn from the first mixing apparatus is reduced to 50° C. to 60° C.,
in the target state a temperature of the reaction mixture exiting the third mixing apparatus of 128° C. to 132° C. results, and
the pressure in the decompression space of plant part (IV) remains at 20 bar to 25 bar.

3. The process as claimed in claim 1, wherein the pressure in the decompression space of plant part (IV), which is established in step (iii), is greater than the pressure in the decompression space of plant part (IV) at which the continuous supplying of A into the first mixing apparatus is started in step (ii).

4. The process as claimed in claim 1, wherein the reaction space and the decompression space of plant part (IV) are arranged in two different apparatuses.

5. The process as claimed in claim 1, wherein the reaction space and the decompression space of plant part (IV) are arranged in a common apparatus.

6. The process as claimed in claim 1, wherein in step (ii) the pressure in the decompression space of plant part (IV) is adjusted by outgassing P, by addition of an inert gas, by addition of hydrogen chloride, or by a combination thereof.

7. The process as claimed in claim 6, comprising adjusting the pressure in the decompression space of plant part (IV) by addition of hydrogen chloride, wherein the hydrogen chloride is withdrawn from the first gaseous phase, the second gaseous phase, the third gaseous phase, or a combination thereof.

8. The process as claimed in claim 1, wherein the performance of step (i)(b) is commenced simultaneously with step (i)(a).

9. The process as claimed in claim 1, wherein the performance of step (i)(b) is commenced before step (i)(a).

10. The process as claimed in claim 1, wherein the performance of step (i)(b) is commenced after step (i)(a).

11. The process as claimed in claim 1, wherein the workup unit comprises:
- a first distillation apparatus configured for separating a P containing fourth gaseous phase from the third liquid phase to obtain a fourth liquid phase depleted in P,
- a second distillation apparatus configured for separating a S containing fifth gaseous phase from the fourth liquid phase to obtain a fifth liquid phase depleted in P and S, and
- a third distillation apparatus configured for obtaining the isocyanate from the fifth liquid phase.

12. The process as claimed in claim 1, wherein after achieving the target state the continuous reaction of AS with PS is interrupted, wherein the interruption is effected by a process comprising:
- (v) increasing the temperature of PS and the temperature of AS at flow rates of PS and AS unchanged relative to the target state;
- (vi) upon achieving a temperature of the reaction mixture exiting the third mixing apparatus of >135° C. to 140° C., terminating the supply of A into the first mixing apparatus while maintaining the supply of S into the first mixing apparatus and maintaining the supply of PS into the second mixing apparatus;
- (vii) terminating the supply of P into the second mixing apparatus while maintaining the supply of S into the second mixing apparatus and while maintaining the supply of S into the first mixing apparatus;
- (viii) after falling below a previously specified threshold concentration of P in the S exiting the second mixing apparatus, terminating the supply of S into the second mixing apparatus; and
- (viii) terminating the supply of S into the first mixing apparatus.

13. The process as claimed in claim 12, wherein in step (v) the temperature of PS is increased to 100° C. to 125° C. and wherein the temperature of AS is increased to 100° C. to 125° C.

14. The process as claimed in claim 12, wherein in step (vi) the supply of A is terminated as soon as the temperature of the reaction mixture exiting the third mixing apparatus is >135° C. to 137° C.

15. The process as claimed in claim 1, wherein A comprises methylene diphenylene diamine, polymethylene polyphenylene polyamine, a mixture of methylene diphenylene diamine and polymethylene polyphenylene polyamine, tolylene diamine, xylylene diamine, pentane-1,5-diamine, hexamethylene-1,6-diamine, isophoronediamine, or naphthyldiamine.

* * * * *